(12) United States Patent
Luo et al.

(10) Patent No.: US 9,501,771 B2
(45) Date of Patent: Nov. 22, 2016

(54) METHOD AND SYSTEM FOR EXCHANGING INFORMATION UPDATES BETWEEN MOBILE DEVICES (71) Applicants: Beijing Kingsoft Internet Security Software Co., Ltd., Beijing (CN); Conew Network Technology (Beijing) Co., Ltd., Beijing (CN); Shell Internet (Beijing) Security Technology Co., Ltd., Shijingshan (CN)

(72) Inventors: Bin Luo, Beijing (CN); Min Zhao, Beijing (CN); Yafeng Luo, Beijing (CN); Ming Xu, Beijing (CN)

(73) Assignees: BEIJING KINGSOFT INTERNET SECURITY SOFTWARE CO., LTD., Beijing (CN); CONEW NETWORK TECHNOLOGY (BEIJING) CO., LTD., Beijing (CN); SHELL INTERNET (BEIJING) SECURITY TECHNOLOGY CO., LTD., Beijing (CN)

( * ) Notice: Subject to any disclaimer, the term of this patent is extended or adjusted under 35 U.S.C. 154(b) by 29 days.

(21) Appl. No.: 14/641,107

(22) Filed: Mar. 6, 2015

(65) Prior Publication Data

US 2015/0334533 A1 Nov. 19, 2015

(30) Foreign Application Priority Data

May 16, 2014 (CN) .......................... 2014 1 0209143

(51) Int. Cl.
*H04W 24/00* (2009.01)
*G06Q 20/32* (2012.01)
*H04W 4/02* (2009.01)
*H04W 12/02* (2009.01)
*H04M 1/725* (2006.01)

(52) U.S. Cl.
CPC ............ *G06Q 20/32* (2013.01); *G06Q 20/325* (2013.01); *H04M 1/72572* (2013.01); *H04W 4/021* (2013.01); *H04W 4/028* (2013.01); *H04W 12/02* (2013.01)

(58) Field of Classification Search
CPC .... H04W 4/12; H04W 4/14; G06Q 30/0251; G06Q 30/0259; G06Q 30/0261; G06Q 30/0267
USPC ......... 455/456.1–457, 466; 705/14.49–14.64
See application file for complete search history.

(56) References Cited

U.S. PATENT DOCUMENTS 7,415,424 B1 * 8/2008 Donner .................. G06Q 10/02 235/382
8,359,045 B1 * 1/2013 Hopkins, III ......... H04W 4/025 455/456.1

(Continued)

*Primary Examiner* — Marcus Hammonds
(74) *Attorney, Agent, or Firm* — Morgan, Lewis & Bockius LLP (57) ABSTRACT

A first mobile device receives a request to send information updates from the first mobile device to the second mobile device, the request specifying a predefined geographical region. In response to the request, the first mobile device checks its current location and determines whether the current location is within the predefined geographical region. After determining that the current location of the first mobile device is within the predefined geographical region, the first mobile device sends a first information update to the second mobile device. Subsequently, the first mobile device sends a second information update to the second mobile device after determining that the current location of the first mobile device is outside the predefined geographical region.

16 Claims, 6 Drawing Sheets

(56) References Cited

U.S. PATENT DOCUMENTS

| | | | | |
|---|---|---|---|---|
| 2005/0136946 A1* | 6/2005 | Trossen | .................. | H04W 4/02 455/456.2 |
| 2006/0223518 A1* | 10/2006 | Haney | .................. | H04W 12/08 455/420 |
| 2014/0046760 A1* | 2/2014 | Keogh | .................. | G06Q 30/02 705/14.53 |

* cited by examiner

METHOD AND SYSTEM FOR EXCHANGING INFORMATION UPDATES BETWEEN MOBILE DEVICES

RELATED APPLICATION

This application claims priority to Chinese Patent Application No. 2014102091433, entitled "Method and device for registering an event" filed on May 16, 2014, which is incorporated by reference in its entirety.

TECHNICAL FIELD

This application relates generally to mobile applications and in particular to method and system for exchanging information updates between mobile devices.

BACKGROUND

Mobile devices are widely used in today's world. The arrival of multi-functional mobile devices (e.g., smartphone or tablet computer) makes it much more convenient for people to be in contact with each other. As a result, many parents now give mobile devices to their children and use the mobile devices to track down their children's activities when they are not with their parents. But today's approaches are too intrusive to the children's privacy or too inconvenient (e.g., a child is asked to make a phone call or send a text message after arriving at certain locations) or both.

SUMMARY

The present application describes methods and systems for exchanging information updates between mobile devices. As stated above in the background, mobile devices are becoming increasingly popular in today's world. Many parents want to use the mobile devices that they give to their children to track down their whereabouts. Approaches described in the present application are less intrusive as well as more convenient than many conventional approaches by giving children certain options of letting parents know where they are and what they are doing.

In accordance with some embodiments, a method of sending information updates to a second mobile device is performed at a first mobile device having one or more processors and memory storing programs executed by the one or more processors. The method includes: receiving a request to send information updates from the first mobile device to the second mobile device, the request specifying a predefined geographical region; checking a current location of the first mobile device; determining whether the current location of the first mobile device is within the predefined geographical region; and sending a first information update to the second mobile device when it is determined that the current location of the first mobile device is within the predefined geographical region, the first information update including a current timestamp of the first mobile device. In some embodiments, the request further includes a predefined time window. The first mobile device is configured to start checking its current location when the current timestamp of the first mobile device is within the predefined time window. The request may include a predefined security code and the first mobile device is configured to encrypt the first information update using the predefined security code. In some other embodiments, the request is transmitted from the second mobile device to the first mobile device when the two mobile devices are physically proximate to each other using one communication manner selected from the group consisting of NFC, acoustic fingerprint, Bluetooth, and Wi-Fi.

In some embodiments, after sending the first information update to the second mobile device, the first mobile device checks a current location of the first mobile device according to a predefined schedule. After determining that the current location of the first mobile device is outside the predefined geographical region, the first mobile device sends a second information update to the second mobile device. The second information update may include a current timestamp of the first mobile device. In some other embodiments, after sending the first information update to the second mobile device, the first mobile device detects a purchase transaction using the first mobile device. After determining that the purchase transaction meets predefined condition, the first mobile device sends a third information update to the second mobile device. For example the third information update may include a product/service associated with the purchase transaction, a price of the product/service and seller information of the product/service.

In some embodiments, there is a binding relationship established between the first mobile device and the second mobile device before the first mobile device receives the request to send information updates to the second mobile device such that the first mobile device communicates with the second mobile device according this binding relationship. For example, the binding relationship between the first mobile device and the second mobile device is uni-directional such that only the second mobile device can update the binding relationship.

In some embodiments, before sending the first information update to the second mobile device, the first mobile device displays a reminder of sending the first information update to its user when the current location of the first mobile device is within the predefined geographical region, the reminder including a confirmation option. After detecting a user selection of the confirmation option, the first mobile device then sends the first information update to the second mobile device. But when there is no user selection of the confirmation option within a predefined time window since the display of the reminder, the first mobile device may send a fourth information update to the second mobile device. In some embodiments, the fourth information update includes the current location of the first mobile device and a moving speed of the first mobile device.

In accordance with some embodiments, a first mobile device includes one or more processors, memory, and one or more programs; the one or more programs are stored in the memory and configured to be executed by the one or more processors and the one or more programs include instructions for performing the operations of the method described above. In accordance with some embodiments, a non-transitory computer readable storage medium has stored therein instructions which, when executed by the first mobile device, cause the device to perform the operations of the method described above.

Thus, mobile devices with touch screens are provided with faster, more efficient and intuitive methods and interfaces for manipulating user interface objects, thereby increasing the effectiveness, efficiency, and user satisfaction with such devices. Such methods and interfaces may complement or replace conventional methods for manipulating user interface objects.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Figure 1:
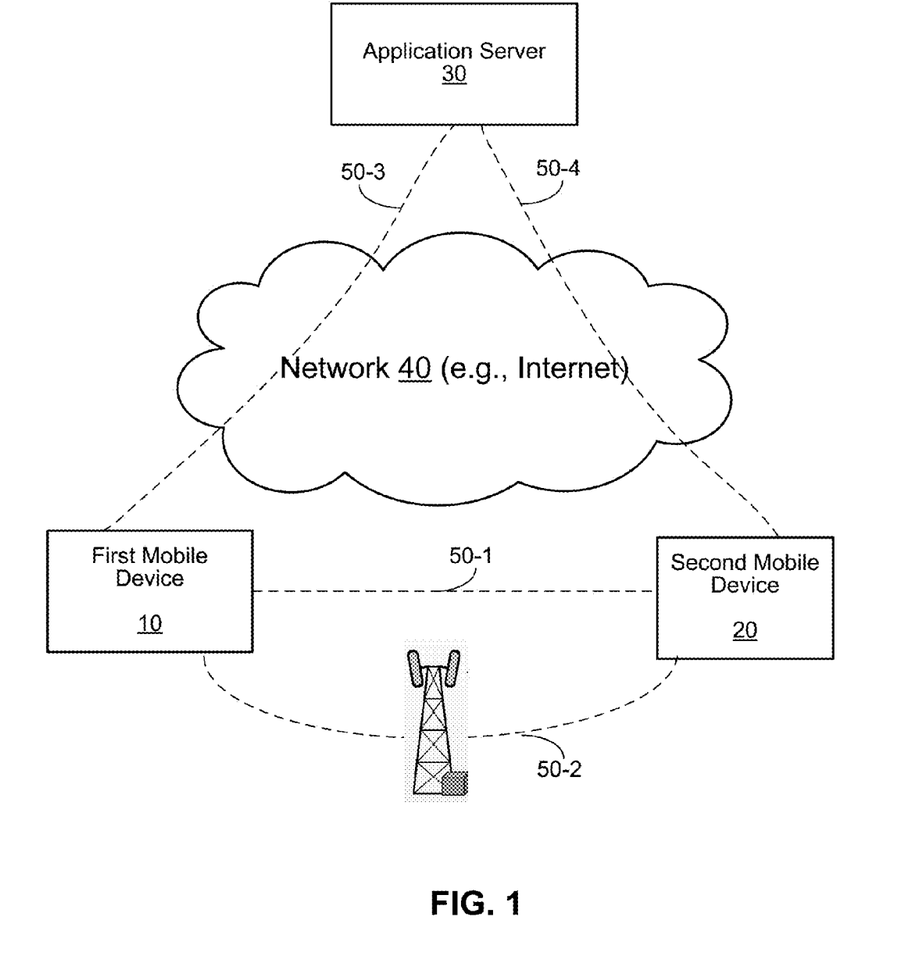
FIG. 1 is a block diagram illustrating a network environment including first and second mobile devices and optionally a network server connecting the first and second mobile devices in accordance with some embodiments.

FIG. 1 is a block diagram illustrating a network environment including first and second mobile devices and optionally a network server connecting the first and second mobile devices in accordance with some embodiments. As shown in FIG. 1, the network environment includes a first mobile device 10 and a second mobile device 20. In some embodiments, the mobile device is a portable communications device, such as a mobile telephone, that also contains other functions, such as PDA and/or music player functions. Other mobile devices, such as laptops or tablet computers with touch-sensitive surfaces (e.g., touch screens and/or touch pads), may also be used. The mobile device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

There are different ways for two mobile devices to communicate with each other. In some embodiments, there is a direct connection 50-1 between the first mobile device 10 and the second mobile device 20. Through this direct connection 50-1, the two mobile devices may exchange data with each other. Embodiments of the direct connection 50-1 include a wired connection between the two mobile devices using a physical cable or a wireless connection between the two mobile devices using different manners such as near-field communication (NFC), acoustic fingerprint, Bluetooth protocol or Wi-Fi protocol. In some other embodiments, the two mobile devices are indirectly connected to each other via a wireless communication network (e.g., the 3G/4G/LTE connection 50-2, etc.). In yet some other embodiments, both the first mobile device 10 and the second mobile device 20 are connected to an application server 30 through the network 40 (e.g., Internet). When the first mobile device 10 communicates with the second mobile device 20, the first mobile device 10 first sends data to the application server 30 through the connection path 50-3 and the application server 30 then forwards the data to the second mobile device 20 through the connection path 50-4 and vice versa. But those skilled in the art would understand that the present application is applicable to any type of connection between the two mobile devices.

Figure 2:
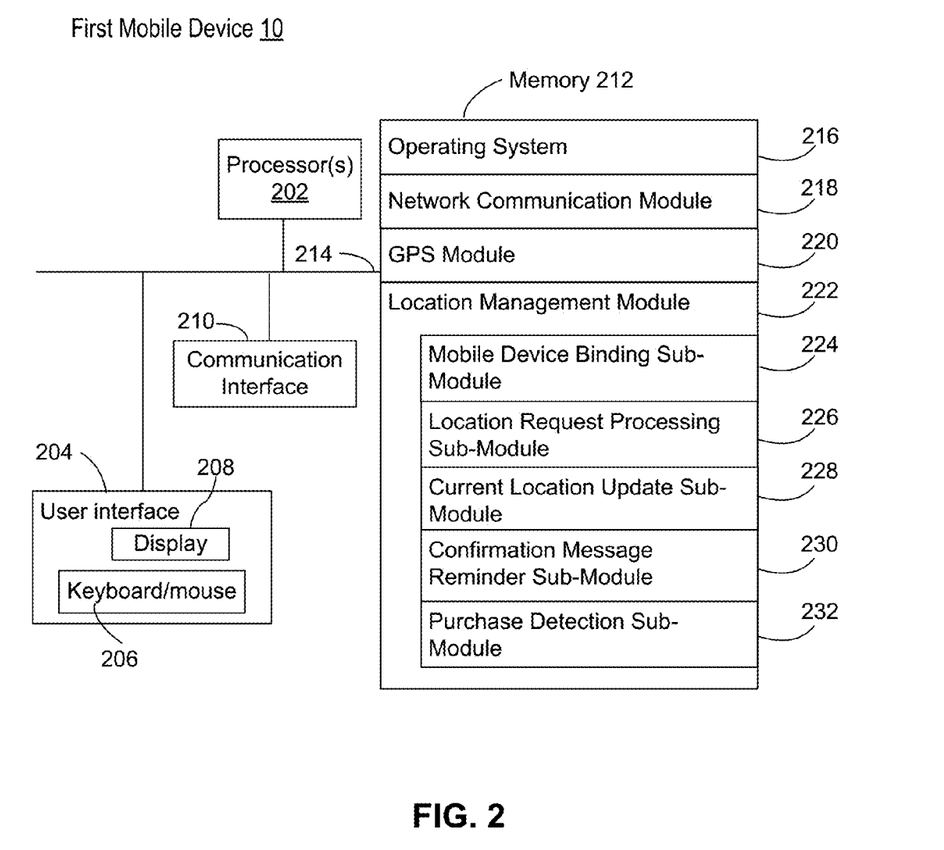
FIG. 2 is a block diagram of exemplary components of a mobile device in accordance with some embodiments.

Attention is now directed toward a mobile device described in the present application. As noted above, the mobile device may be in different form factors. FIG. 2 is a block diagram of exemplary components of a first mobile device 10 in accordance with some embodiments. The first mobile device 10 includes one or more processors 202 for executing modules, programs and/or instructions stored in memory 212 and thereby performing predefined operations; one or more network or other communications interfaces 210; memory 212; and one or more communication buses 214 for interconnecting these components or interconnecting the first mobile device 10 with another device (e.g., the second mobile device 20 or the application server 30). In some embodiments, the first mobile device 10 includes a user interface 204 comprising a display device 208 and one or more input devices 206 (e.g., keyboard or mouse or a touchscreen as shown in FIGS. 4A-4D).

In some embodiments, the memory 212 includes high-speed random access memory, such as DRAM, SRAM, DDR RAM or other random access solid state memory devices. In some embodiments, the memory 212 includes non-volatile memory, such as one or more magnetic disk storage devices, optical disk storage devices, flash memory devices, or other non-volatile solid state storage devices. In some embodiments, the memory 212 includes one or more storage devices remotely located from the processor(s) 202. Memory 212, or alternately one or more storage devices (e.g., one or more nonvolatile storage devices) within the memory 212, includes a non-transitory computer readable storage medium. In some embodiments, the memory 212 or the computer readable storage medium of the memory 212 stores the following programs, modules and data structures, or a subset thereof:

- an operating system 216 that includes procedures for handling various basic system services and for performing hardware dependent tasks;
- a network communications module 218 that is used for connecting the first mobile device 10 to other computers (e.g., the second mobile device 20 or the remote application server 30 in FIG. 1) via the communication network interfaces 210 and one or more communication networks (wired or wireless), such as the Internet, other wide area networks, local area networks (Bluetooth or WiFi), metropolitan area networks, NFC, acoustic fingerprint, etc.;
- a global positioning system (GPS) module 220 for determining the current location of the first mobile device 10;
- a location management module 220 for managing the communication of the current location of the first mobile device 10 to the second mobile device 20 as described below; in some embodiments, the location management module 220 further includes:

- a mobile device binding sub-module 224 for binding the first mobile device 10 to the second mobile device 20 as described below;
- a location request processing sub-module 226 for receiving and processing location requests from the second mobile device 20 as described below;
- a current location update sub-module 228 for detecting the current location of the first mobile device 10, e.g., via the GPS module 220, and determining whether the current location meets predefined criteria as described below;
- a confirmation message reminder sub-module 230 for reminding the user of the first mobile device 10 (e.g., a child) that he or she is required to send the current location of the first mobile device to the second mobile device 20 used by a parent per predefined conditions; and
- a purchase detection sub-module 232 for detecting the use of the first mobile device 10 in connection with a purchase transaction and determining whether such purchase transaction should be reported to the second mobile device 20 per predefined conditions.

Having described the components of the first mobile device 10 that are relevant to the present application, attention is directed to how the first mobile device 10 communicates with the second mobile device 20 to report its current location. FIGS. 3A-3D are flow diagrams illustrating how a first mobile device sends information updates to a second mobile device in accordance with some embodiments. For illustrative purposes, it is assumed that the user of the first mobile device 10 is a child (e.g., a teenager) and the user of the second mobile device 20 is a parent of the child and the child is embarking a trip to a remote location (e.g., a camping site) without the parent's presence. For safety reason, the parent would be interested in knowing when the child arrives at the camping site, when the child leaves the camping site, and what the child does at the camping site. In some embodiments, both the first mobile device 10 and the second mobile device 20 have pre-installed an application so that the two mobile devices can communicate with each other about their current locations or one mobile device (e.g., the first mobile device 10) can notify another mobile device (e.g., the second mobile device 20) of its whereabouts. Note that this location update application may be a standalone application or a feature found in another application (e.g., a social networking application). But as will be described below in more detail. This feature is different from those conventional social networking applications that allow users to share their current locations with others. Instead, this feature is primarily used for safety checks such that it offers some unique functionality not found in today's social networking applications.

Figure 3A:
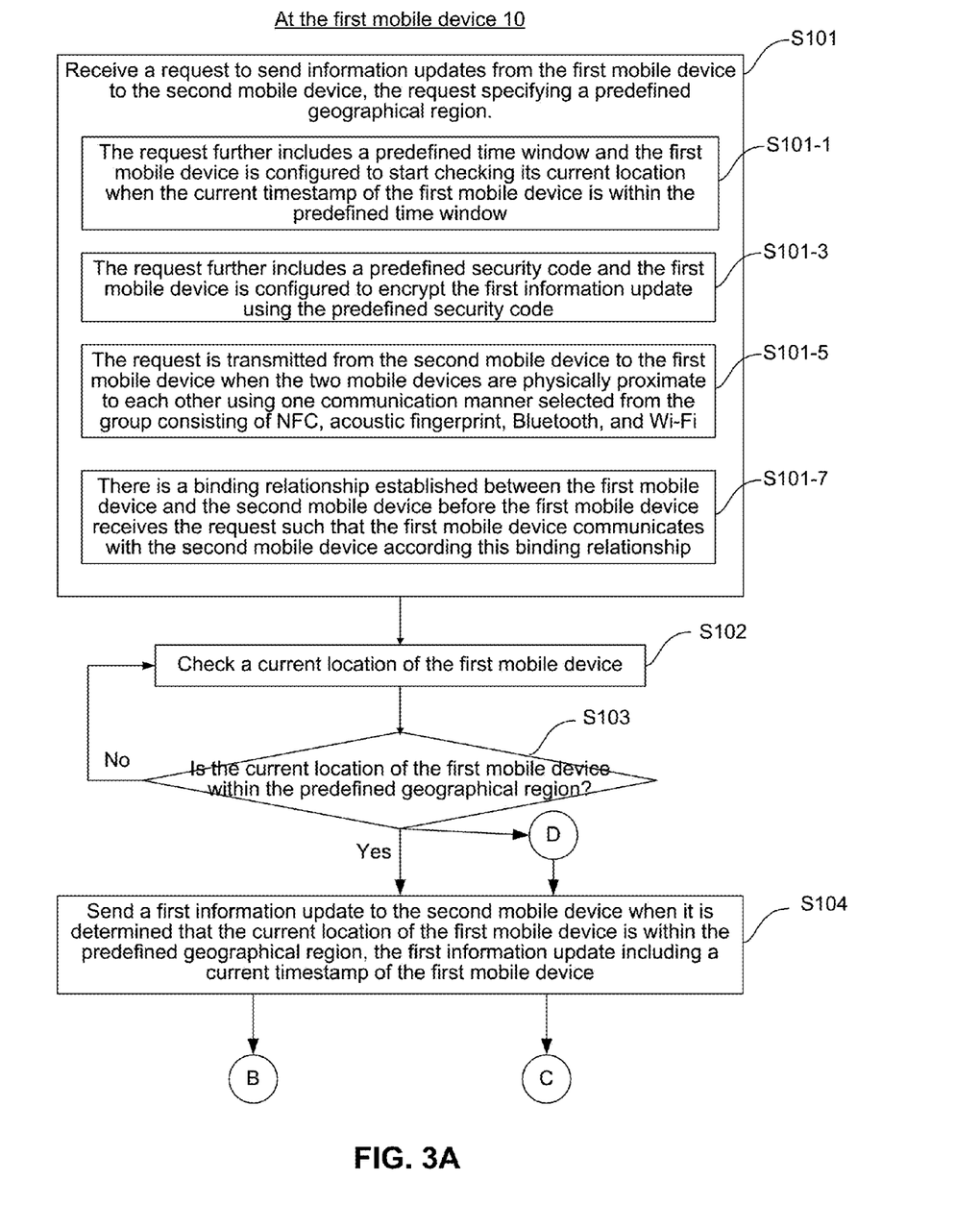
FIGS. 3A-3D are flow diagrams illustrating how a first mobile device sends information updates to a second mobile device in accordance with some embodiments.
Figure 3B:
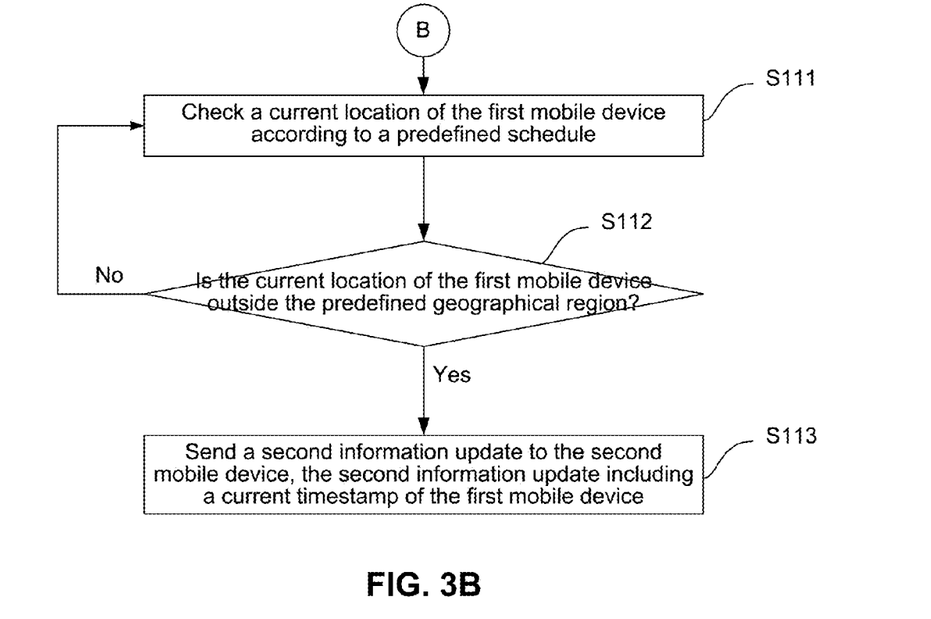
Figure 3C:
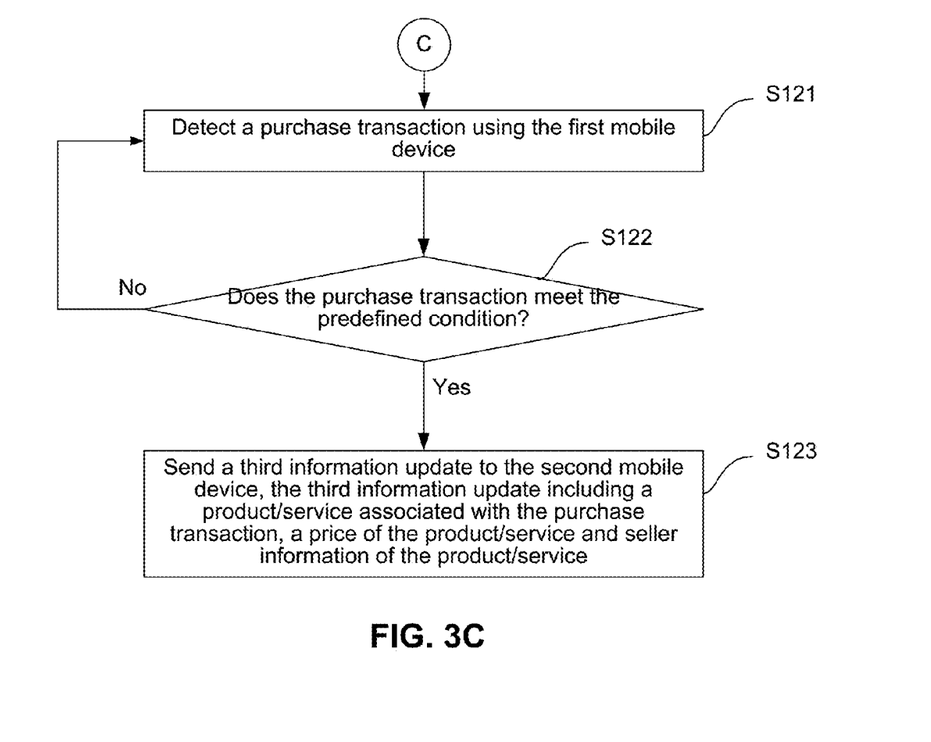
Figure 3D:
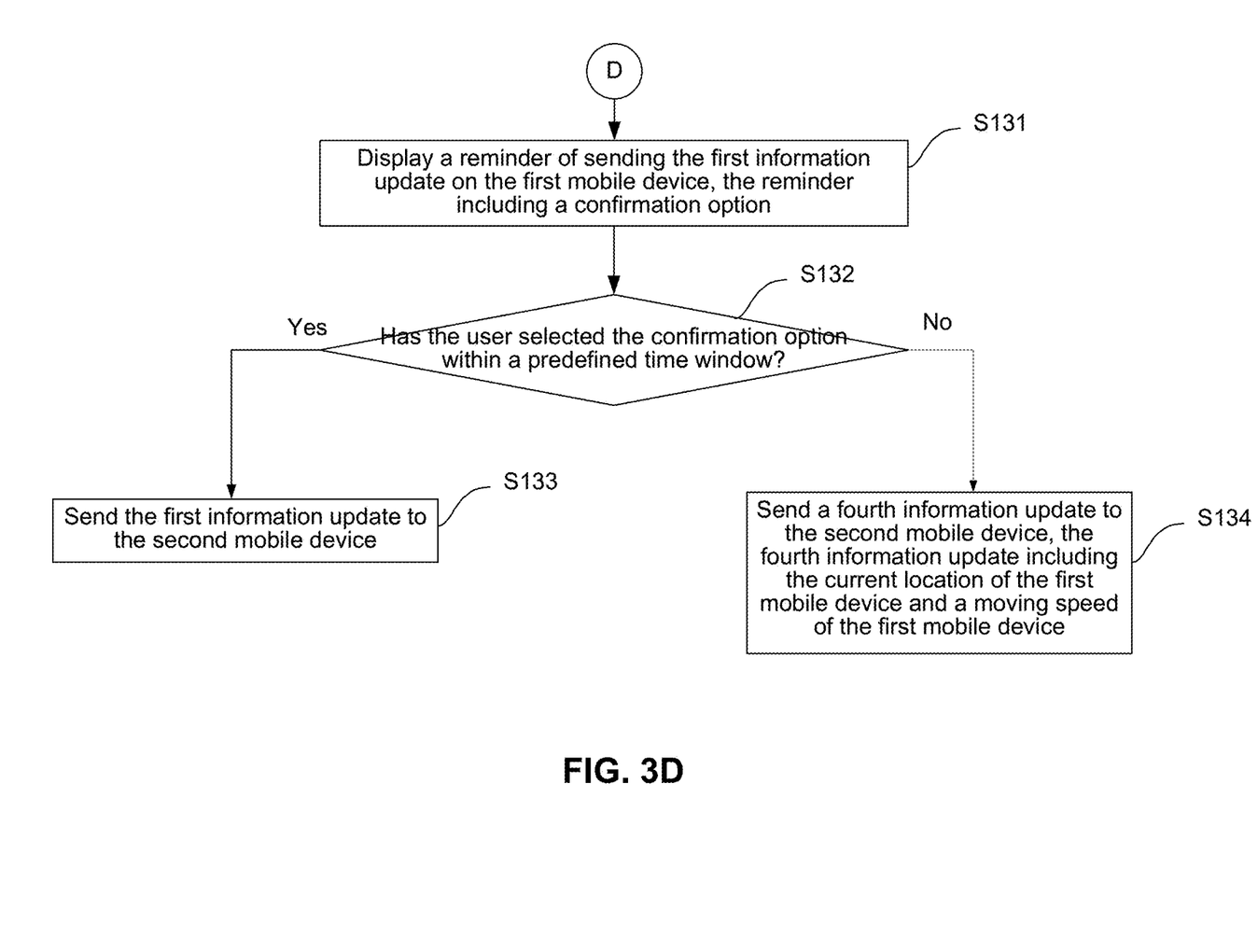

At some point in time, the first mobile device 10 receives (S101) a request to send information updates from the first mobile device 10 to the second mobile device 20, the request typically specifying a predefined geographical region. The predefined geographical region is the target location that the user of the first mobile device 10 is going to visit. By specifying the predefined geographical region, the second mobile device 20 indicates that it is interested in receiving a location update from the first mobile device 10 when it arrives at the predefined region.

In some embodiments, the first mobile device 10 starts checking its current location right after receiving the request and may repeat the step at a regular time interval (e.g., every minute) until it arrives at the predefined region. In some other embodiments, the request further includes (S101-1) a predefined time window in addition to the predefined geographical region such that the first mobile device 10 is configured to start checking its current location when its current timestamp is within the predefined time window. A benefit from defining a time window is to reduce the power consumption at the first mobile device 10 so that it does not have to spend too much power on the GPS module 220 by checking its current location repeatedly. For example, when the parent of the second mobile device 20 initiates its request to the first mobile device 10, the parent may know roughly how long the child may arrive at the destination (e.g., 11 am-1 pm or two hours from the current time). Therefore, the request may specify when the location update at the first mobile device 10 starts by defining a corresponding time window.

In some embodiments, a further security protection mechanism may be used to make sure that any location update received by the second mobile device 20, which is allegedly from the first mobile device 10, should be encrypted such that only the user of the second mobile device 20 knows how to decode the location update. In other words, if the second mobile device 20 receives a location update but it is unable to decode the message, the user of the second mobile device 20 should be alerted of so and take necessary actions accordingly. Therefore, the request may further include (S101-5) a predefined security code and the first mobile device 10 is configured to encrypt the location update using the predefined security code. For example, the security code may be something specified by the parent user of the second mobile device 20 when initiating the request to the first mobile device 10. Upon receipt of the location update, the second mobile device 20 then decodes the message using the security code provided by the parent user of the second mobile device 20. If the second mobile device 20 is unable to decode the location update message correctly, it should notify the parent user.

As shown in FIG. 1, there are different ways for the two mobile devices to communicate with each other. Similarly, there are different ways for the first mobile device 10 to receive the request initiated by the parent user of the second mobile device 20. For example, the parent user may choose to initiate a request by sending a message to the first mobile device 10 through the application server 30, e.g., if the location update is a feature of another mobile application or via the wireless network. In some embodiments, the parent user of the second mobile device 20 arranges transmitting the request from the second mobile device 20 to the first mobile device 10 before the child user of the first mobile device 10 leaves home. For example, the request may be transmitted (S101-5) from the second mobile device 20 to the first mobile device 10 when the two mobile devices are physically proximate to each other (within the same room) using one communication manner such as NFC, acoustic fingerprint, Bluetooth, and Wi-Fi. This approach is useful when the parent user includes a security code in the request because it is less likely for a third-party to intercept the security code if the transmission is conducted locally.

In some embodiments, the first mobile device 10 cannot receive the request from the second mobile device 20 unless there is a pre-existing binding relationship between the two mobile devices (S101-7). To do so, the second mobile device 20 may send a binding relationship request to the first mobile device 10 before sending the request for location update. For example, before the parent user gives the first mobile device 10 to the child user, the parent user may establish a binding relationship between the two mobile devices. In the binding relationship, the parent user can specify when and where and under what condition(s) the first mobile device 10 needs to report its current location to the second mobile device 20. This binding relationship is stored in the first mobile device's memory and password-protected such that the child user cannot eliminate/modify the binding relationship and only the parent user can do so. In other words, the binding relationship between the first mobile device and the second mobile device is uni-directional such that only the second mobile device can update the binding relationship. After establishing the binding relationship, the parent user only needs to send a request as described above to invoke the first mobile device 10 to communicate with the second mobile device 20 (e.g., reporting its current location) according to the binding relationship stored in the first mobile device 10.

Upon receipt of the request, the first mobile device 10 then checks (S102) its current relationship (optionally if the current timestamp is also within the predefined time window). If the current relationship is within the predefined geographical region (S103-Yes), the first mobile device 10 then sends (S104) a first information update to the second mobile device 20, the first information update including a current timestamp of the first mobile device 10. Otherwise (S103-No), the first mobile device 10 may return to check its current location and determine whether it is within the predefined region sometime later (e.g., according to a predefined time interval).

In some embodiments (shown in FIG. 3B), after sending the first information update of the current location of the first mobile device 10, the first mobile device 10 may check (S111) a current location of the first mobile device according to a predefined schedule (e.g., every five minutes) and determine (S112) whether the current location of the first mobile device is within the predefined geographical region. After it is determined that the current location of the first mobile device is outside the predefined geographical region, the first mobile device 10 then sends (S113) a second information update to the second mobile device 20, the second information update including a current timestamp of the first mobile device 10.

In some embodiments (shown in FIG. 3C), after sending the first information update of the current location of the first mobile device 10, the first mobile device 10 may detect (S121) that the child user of the first mobile device 10 is making a purchase transaction using the first mobile device 10 (e.g., the first mobile device 10 may install an application for purchasing food or movie tickets. In this case, the first mobile device 10 may determine (S122) whether the purchase transaction meets predefined condition. For example, whether the purchased movie ticket is for a movie appropriate for the child user of the first mobile device 10. If the predefined condition is met, the first mobile device may send (S123) a third information update to the second mobile device, the third information update including a product/service associated with the purchase transaction, a price of the product/service and seller information of the product/service.

Figure 4A:
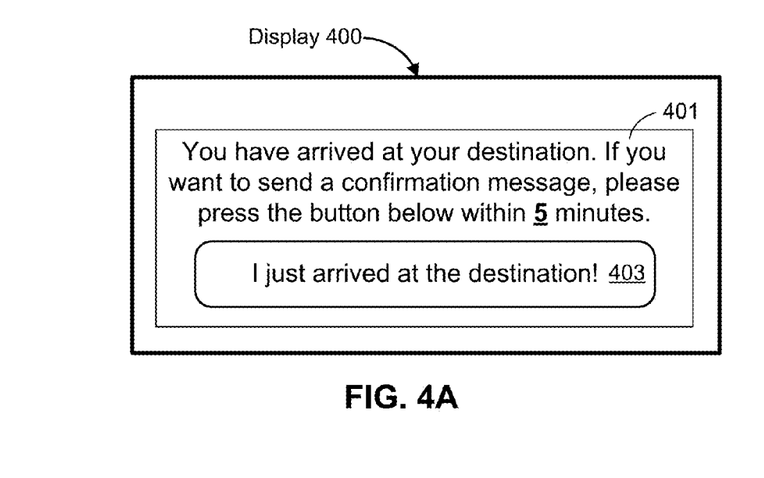
FIGS. 4A-4D are exemplary user interfaces displayed on the first mobile device in accordance with some embodiments.
Figure 4B:
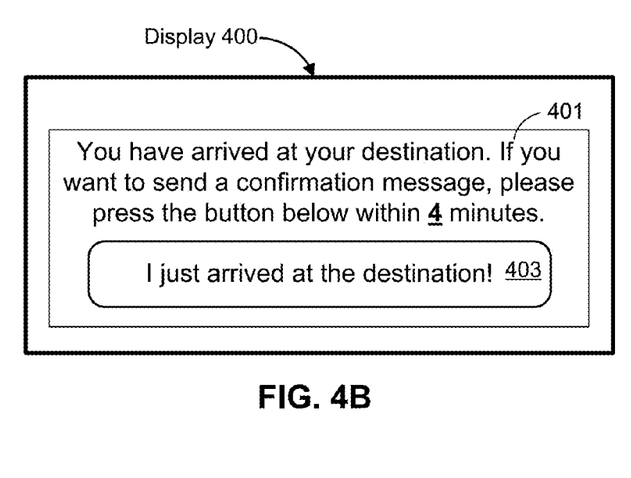
Figure 4C:
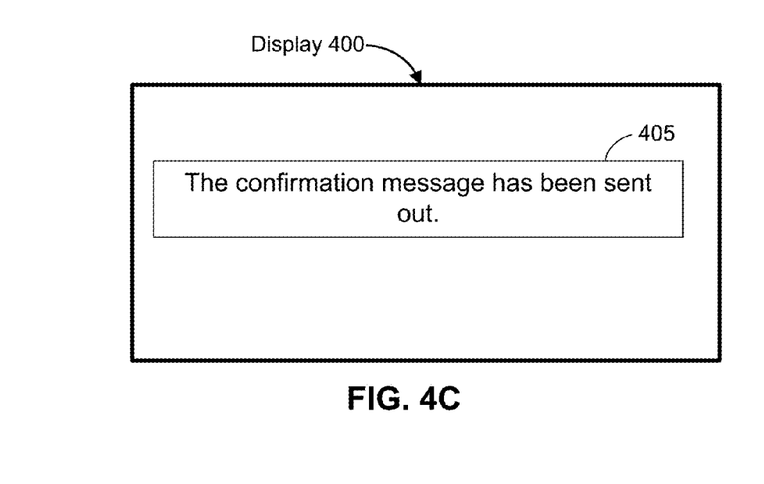
Figure 4D:
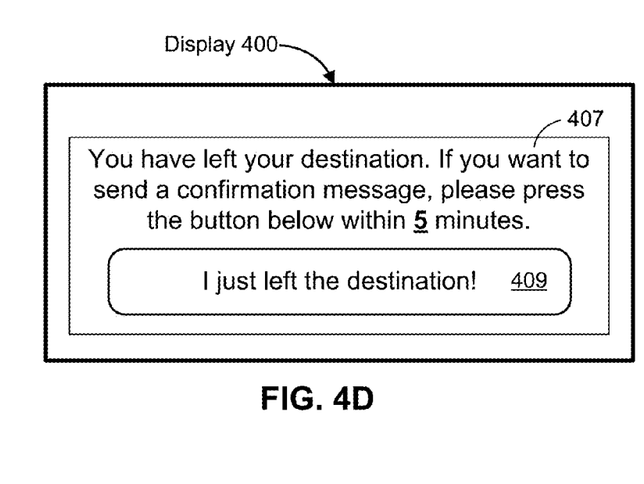

In some embodiments, (shown in FIG. 3D), before sending the first information update to the second mobile device, the first mobile device 10 displays (S131) a reminder of sending the first information update on the first mobile device when it is determined that the current location of the first mobile device is within the predefined geographical region, the reminder including a confirmation option. FIG. 4A depicts an exemplary screenshot of a reminder message 401 that includes a confirmation option 403. In this case, there is a time window of five minutes for the user of the first mobile device 10 to confirm the transmission of the first information update. As shown in FIG. 4B, the time window reduces as time goes on. FIG. 4D is a similar screenshot depicting the reminder when the user of the first mobile device 10 departs the destination. If the child user selects (S132-Yes) the confirmation option 403, the first mobile device 10 then sends (S133) the first information update to the second mobile device. A screenshot of the first mobile device 10 after sending the confirmation message 405 is depicted in FIG. 4C. Otherwise (S132-No), when there is no user selection of the confirmation option within a predefined time window since the display of the reminder, the first mobile device 10 sends (S134) a fourth information update to the second mobile device, the fourth information update including the current location of the first mobile device and a moving speed of the first mobile device. Based on the moving speed information, the parent user of the second mobile device 20 can tell that the child user did not respond to the reminder and the parent user may choose to call the child user to make sure that he or she is fine.

While particular embodiments are described above, it will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for sending information updates from a first mobile device to a second mobile device, the method comprising:
   at the first mobile device having one or more processors and memory storing programs executed by the one or more processors,
      receiving a request to send information updates from the first mobile device to the second mobile device, the request specifying a predefined geographical region;
      checking a current location of the first mobile device;
      determining whether the current location of the first mobile device is within the predefined geographical region;
      displaying a reminder of sending a first information update to the second mobile device on the first mobile device when it is determined that the current location of the first mobile device is within the predefined geographical region, the reminder including a confirmation option and a predefined reducing time window for a user to select the confirmation option;
      sending the first information update to the second mobile device after detecting a user selection of the confirmation option within the predefined reducing time window, the first information update including a current timestamp of the first mobile device; and
      when there is no user selection of the confirmation option within the predefined reducing time window since the display of the reminder, sending a fourth information update to the second mobile device, the fourth information update including the current location of the first mobile device and a moving speed of the first mobile device.

2. The method of claim 1, wherein the request further includes a predefined time window and the first mobile device is configured to start checking its current location when the current timestamp of the first mobile device is within the predefined time window.

3. The method of claim 1, wherein the request further includes a predefined security code and the first mobile device is configured to encrypt the first information update using the predefined security code.

4. The method of claim 1, wherein the request is transmitted from the second mobile device to the first mobile device when the two mobile devices are physically proximate to each other using one communication manner selected from the group consisting of NFC, acoustic fingerprint, Bluetooth, and Wi-Fi.

5. The method of claim 1, further comprising:
   after sending the first information update to the second mobile device:
      checking a current location of the first mobile device according to a predefined schedule;
      determining whether the current location of the first mobile device is within the predefined geographical region; and
      sending a second information update to the second mobile device after it is determined that the current location of the first mobile device is outside the predefined geographical region, the second information update including a current timestamp of the first mobile device.

6. The method of claim 1, further comprising:
   after sending the first information update to the second mobile device:
      detecting a purchase transaction using the first mobile device;
      determining whether the purchase transaction meets predefined condition; and
      sending a third information update to the second mobile device after it is determined that the purchase transaction meets the predefined condition, the third information update including a product/service associated with the purchase transaction, a price of the product/service and seller information of the product/service.

7. The method of claim 1, wherein there is a binding relationship established between the first mobile device and the second mobile device before the first mobile device receives the request to send information updates to the second mobile device such that the first mobile device communicates with the second mobile device according this binding relationship.

8. The method of claim 7, wherein the binding relationship between the first mobile device and the second mobile device is uni-directional such that only the second mobile device can update the binding relationship.

9. A first mobile device, comprising:
   one or more processors;
   memory; and
   one or more programs, wherein the one or more programs are stored in the memory and configured to be executed by the one or more processors, the one or more programs including instructions for:
      receiving a request to send information updates from the first mobile device to a second mobile device, the request specifying a predefined geographical region;
      checking a current location of the first mobile device;
      determining whether the current location of the first mobile device is within the predefined geographical region;
      displaying a reminder of sending a first information update to the second mobile device on the first mobile device when it is determined that the current location of the first mobile device is within the predefined geographical region, the reminder including a confirmation option and a predefined reducing time window for a user to select the confirmation option;
      sending the first information update to the second mobile device after detecting a user selection of the confirmation option within the predefined reducing time window, the first information update including a current timestamp of the first mobile device; and
      when there is no user selection of the confirmation option within the predefined reducing time window since the display of the reminder, sending a fourth information update to the second mobile device, the fourth information update including the current location of the first mobile device and a moving speed of the first mobile device.

10. The first mobile device of claim 9, wherein the request further includes a predefined time window and the first mobile device is configured to start checking its current location when the current timestamp of the first mobile device is within the predefined time window.

11. The first mobile device of claim 9, wherein the one or more programs further include instructions for:
after sending the first information update to the second mobile device:
checking a current location of the first mobile device according to a predefined schedule;
determining whether the current location of the first mobile device is within the predefined geographical region; and
sending a second information update to the second mobile device after it is determined that the current location of the first mobile device is outside the predefined geographical region, the second information update including a current timestamp of the first mobile device.

12. The first mobile device of claim 9, wherein the one or more programs further include instructions for:
after sending the first information update to the second mobile device:
detecting a purchase transaction using the first mobile device;
determining whether the purchase transaction meets predefined condition; and
sending a third information update to the second mobile device after it is determined that the purchase transaction meets the predefined condition, the third information update including a product/service associated with the purchase transaction, a price of the product/service and seller information of the product/service.

13. The first mobile device of claim 9, wherein there is a binding relationship established between the first mobile device and the second mobile device before the first mobile device receives the request to send information updates to the second mobile device such that the first mobile device communicates with the second mobile device according this binding relationship.

14. A non-transitory computer readable storage medium storing one or more programs, the one or more programs comprising instructions, which when executed by a first mobile device, cause the first mobile device to:
receive a request to send information updates from the first mobile device to a second mobile device, the request specifying a predefined geographical region;
check a current location of the first mobile device;
determine whether the current location of the first mobile device is within the predefined geographical region;
display a reminder of sending a first information update to the second mobile device on the first mobile device when it is determined that the current location of the first mobile device is within the predefined geographical region, the reminder including a confirmation option and a predefined reducing time window for a user to select the confirmation option;
send the first information update to the second mobile device after detecting a user selection of the confirmation option within the predefined reducing time window, the first information update including a current timestamp of the first mobile device; and
when there is no user selection of the confirmation option within the predefined reducing time window since the display of the reminder, send a fourth information update to the second mobile device, the fourth information update including the current location of the first mobile device and a moving speed of the first mobile device.

15. The non-transitory computer readable storage medium of claim 14, wherein the request further includes a predefined time window and the first mobile device is configured to start checking its current location when the current timestamp of the first mobile device is within the predefined time window.

16. The non-transitory computer readable storage medium of claim 14, wherein the one or more programs further include instructions for:
after sending the first information update to the second mobile device:
checking a current location of the first mobile device according to a predefined schedule;
determining whether the current location of the first mobile device is within the predefined geographical region; and
sending a second information update to the second mobile device after it is determined that the current location of the first mobile device is outside the predefined geographical region, the second information update including a current timestamp of the first mobile device.

* * * * *